Aug. 27, 1963  T. W. BONNER  3,102,198
SENSITIVE LOW VOLTAGE PROPORTIONAL COUNTER FOR NEUTRON
DETECTION CONTAINING He³ AT SUPERATMOSPHERIC PRESSURE
Filed Nov. 16, 1961

TOM W. BONNER
INVENTOR.

BY *D. Carl Richards*

ATTORNEY

United States Patent Office 3,102,198
Patented Aug. 27, 1963

3,102,198
SENSITIVE LOW VOLTAGE PROPORTIONAL COUNTER FOR NEUTRON DETECTION CONTAINING He³ AT SUPERATMOSPHERIC PRESSURE
Tom W. Bonner, Houston, Tex., assignor to Socony Mobil Oil Company, Inc., a corporation of New York
Filed Nov. 16, 1961, Ser. No. 155,881
11 Claims. (Cl. 250—83.1)

This invention relates to the detection of thermal and epithermal neutrons and more particularly to a system which employs reactions with nuclei of helium-3 confined under superatmospheric pressures.

This application is a continuation-in-part of U.S. application Serial No. 675,655, filed August 1, 1957, now abandoned.

In prior art systems proportional counters have been employed in which boron trifluoride gas is used as the ionizable medium. In such applications as radioactive well logging and neutron shielding studies, proportional counters are employed for the measurement of thermal neutrons but the efficiency is relatively low, thus requiring in the former case extremely low logging speeds. The desired increase in efficiency may not be achieved by increased pressures when employing such a gas without requiring an undue increase in the operating voltage. Even when this is done, however, the BF₃ counter is sensitive to gamma rays as well as neutrons. A gas such as helium-4 has been employed in detectors but it is stable and insensitive to neutrons except where energies exceed about 10 m.e.v. It has been found that helium-3 has a high cross section for the (n, p) reaction, and it has further been found that helium-3 may be employed at superatmospheric pressures thereby to provide a highly sensitive and efficient counting unit.

More particularly in accordance with the present invention, there is provided a radiation detector of the proportional counter type having an enclosure with helium-3 gas disposed within the enclosure at superatmospheric pressures preferably in the order of about two to about twenty atmospheres absolute. An electrode extending into the enclosure in contact with the helium-3 gas is electrically insulated and supported from the enclosure walls. A voltage source connected between the walls of the enclosure and the electrode serves to provide an electrostatic field for the collection of ionized particles produced in the confined zone of helium-3 by the entry therein of thermal and epithermal neutrons.

In the application of the present invention to radioactive well logging, the detector is moved along the length of the well bore. At least two electrodes in electrically conductive contact with the helium-3 gas are connected in circuit with a voltage source to establish an electrostatic field in the zone and to collect ionized particles of the gas produced upon entry thereto of neutrons from the earth formations.

In another aspect of the invention there is provided a cadmium or boron shield encompassing the confined zone whereby thermal neutrons are eliminated; epithermal neutrons then enter the zone for detection.

For a more complete understanding of the present invention and for further objects and advantages thereof, reference may now be had to the following description taken in conjunction with the accompanying drawings in which.

In detecting neutrons at thermal and epithermal energies a major problem has been to detect a substantial percent of the neutrons entering a detector and at the same time to eliminate any indication of the presence of gamma rays. Boron trifluoride (BF₃) proportional counters have been used at pressures of the order of an atmosphere and generally below such pressures. It is well known that the increase of pressure in a BF₃ counter will render the counter sensitive to gamma rays and further that in order to operate such a counter at increased pressures an unduly high operating voltage is required. Thus there has been a need for a proportional counter sensitive to low energy neutrons and insensitive to gamma rays which will operate somewhat below 3000 volts, preferably in the order of about 800 volts to about 2000 volts. The detector of the present invention satisfies the foregoing needs in that it is characterized by its superatmospheric pressure and its high sensitivity to low energy neutrons at low operating voltages.

Figure 1:
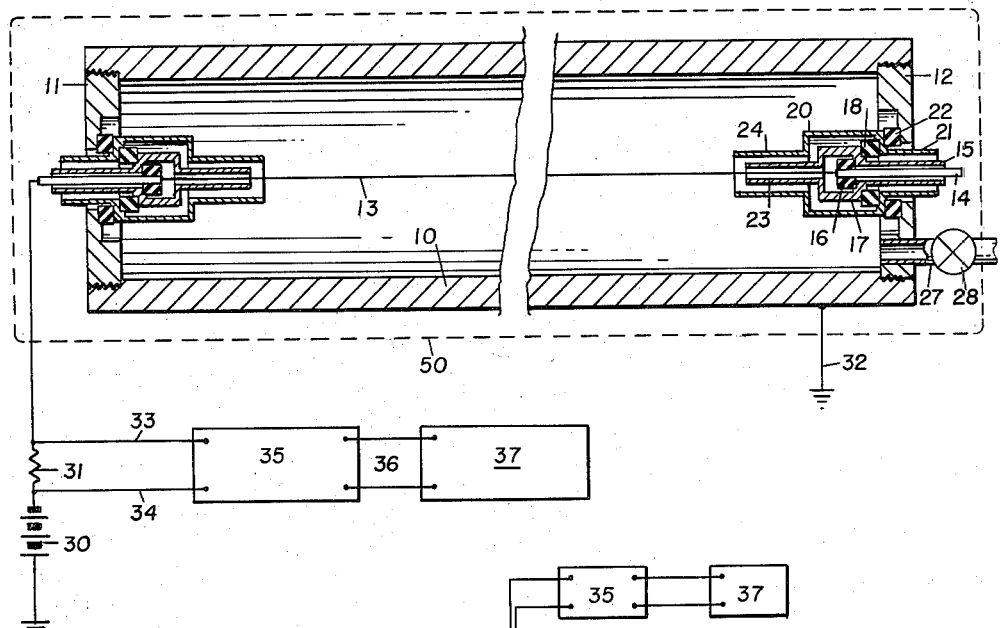
FIG. 1 is a sectional view of the detector of the present invention.

More particularly, in FIG. 1 there is illustrated a detector of the proportional counter type which comprises a cylinder 10 which may be relatively thin and made of material which is characterized by absence of neutron resonances in the thermal and epithermal region. A representative material is aluminum. Cylinder 10 is internally threaded at each end thereof. End plates 11 and 12 are fitted in the ends of cylinder 10 and are sealed as to withstand high gas pressures. A metallic electrode 13 formed of small diameter wire is anchored at the ends thereof in suitable terminals mounted in the end plates 11 and 12 with construction which may be identical at both plates 11 and 12. More particularly, the electrode 13 is fitted into a rod 14 which extends through a tube 15 and is insulated therefrom by means of a quartz or ceramic insulating ring 16. Ring 16 serves to support the rod 14 and in turn is mounted in the end of electrode 15. Electrode 15 is provided at the inner end thereof with a bell-shaped fitting 17 which is supported by an insulating ring 18 of quartz or ceramic which in turn is supported inside a bell-shaped end member or extension 20 of an outer cylinder 21. Cylinder 21 and extension 20 in turn are insulated and spaced from the end member 12 by a third insulating ring 22 of quartz or ceramic.

A thin-walled conductive tube 23 extends coaxially of the electrode 13 and encompasses electrode 13, being supported at the end thereof from the member 17. A field electrode 24 cylindrical in form similarly extends from and is supported by the member 20. Field electrode 24 is coaxial with tube 23 and electrode 13 and extends farther into the cylinder 10 than tube 23. Electrodes 23 and 24 are employed to minimize end effects in the detector.

A tube 27 extends through the end member 12 and is provided with a pressure type valve 28 which serves to permit evacuation in filling of the cylinder 10. When cylinder 10 is completed as above described, the system is then filled with helium-3 at a substantially elevated or superatmospheric pressure of at least several atmospheres, and preferably of the order of two to twenty atmospheres. There also may be included a quenching gas at a pressure of substantially less than one-half of one atmosphere. The manner of effecting such transfer of the stated isotope of helium is well known to those skilled in the art. It has been found that the use of high-purity helium-3 which is free from tritium contamination as the detector gas when used substantially exclusively in the detecting system provides a paritcularly efficient means for measuring neutrons of energies within the thermal region. Helium-3 occurs naturally with helium-4 in the ratio of one part to $10^6$–$10^7$, depending upon the source of the helium. It has been found that helium-3 has a cross section of about 5000 barns where the reaction with respect to radiation by thermal neutrons is He³ (n, p) H³.

The marked efficiency of detectors constructed in accordance with the present invention is exhibited by test data collected from two detectors containing helium-3 at super-atmospheric pressures. One of the detectors, or counters, contained helium-3 at an absolute pressure of two and one-half atmospheres absolute. The tritium content of the helium-3 was less than one part in $10^{11}$. With a voltage of 900 volts applied across the electrodes, the counter exhibited an efficiency of 6.6 times that of a conventional boron trifluoride counter.

The second counter contained helium-3 at a pressure of seven atmospheres absolute. The tritium content of the helium-3 was less than one part in $10^{11}$. The only other filling gas was carbon dioxide at a partial pressure of 1.5 centimeters of mercury. It is added for quenching purposes. This counter exhibited an efficiency with respect to the detection of thermal neutrons in one case of 32 times that of a conventional boron trifluoride counter and an efficiency response to epithermal neutrons of as much as 27 times that of a conventional boron trifluoride counter. In other tests conducted with the second detector and the conventional boron trifluoride counter, efficiencies to epithermal neutrons were determined as high as 42 times that of the conventional boron trifluoride counter.

In addition, these marked efficiencies are obtained by employing relatively low voltages across the electrodes of the counters. The voltage applied to the electrode of the second counter, for example, was only 1100 volts.

Another feature of neutron detectors constructed in accordance with the present invention is their relative insensitivity to fluctuations in voltage applied to the electrode. The detector containing two and one-half atmospheres of helium exhibited a characteristic plateau wherein the electrode voltage could be varied from approximately 850 volts to approximately 975 volts with only a three percent change in the counting rate of the detector. The second detector having approximately seven atmospheres absolute of helium exhibited a similar plateau wherein the voltage could be changed from approximately 1100 volts to approximately 1275 volts with only a three percent change in the counting rate of the detector.

The test conducted with the helium-3 detector containing two and one-half atmospheres of helium-3 involved the use of a polonium-beryllium source of neutrons with both the helium-3 detector of the present invention and the conventional boron trifluoride counter spaced equal distances from the source. The measurements by the detectors of thermal neutrons were conducted separately, but in each instance the detector was exposed to the source over a fixed period of 200 seconds. Over this period of time the helium-3 counter recorded a total count of 21,018; whereas, the boron trifluoride counter recorded a total count of 3,311. The boron trifluoride counter employed was a Nancy Wood type, model G-1512, having an outside diameter of 1½ inches, a length of 17 inches, an effective length of 12 inches, and a boron trifluoride content under pressure of 40 centimeters of mercury.

The efficiency of the helium-3 counter containing helium-3 gas at seven atmospheres absolute was compared with a boron trifluoride counter which was ⅝ inch in diameter by 9½ inches long and filled with boron trifluoride gas to a pressure of 40 centimeters of mercury. Each counter was in turn exposed to paraffin-moderated neutrons from a polonium-beryllium source and from a 14 m.e.v. source. The response to thermal and epithermal neutrons was measured by observing counting rates with and without a cadmium shield around the counter.

Logs of natural or induced radioactivity have been obtained in well bores with known counters. The efficiency of measurement of thermal energy neutrons is so low that slow logging speeds are necessary in order to obtain reliable results. With helium-3 employed in the detector system at elevated pressures, logging speeds may substantially be increased thereby greatly minimizing the costs involved in obtaining radioactive logs, such costs including factors such as shut-down time on associated equipment at a well site as well as the time required for the measuring system itself.

As shown in FIG. 1, a source 30 of D.C. potential preferably of the order of 1000 volts is applied between the electrode 13 and ground, the circuit being completed by way of a resistor 31. The case or cylinder 10 is connected to ground as at connection 32. Conductors 33 and 34 apply voltages developed across resistor 31 to a pulse amplifier and measuring unit 35 which in turn applies the output thereof by way of channel 36 to a suitable register device or recorder 37.

Use of the system thus far described will permit detection with high efficiencies of the neutrons entering the detector with energies of thermal and epithermal levels. In order to detect only epithermal neutrons, there may be provided a shield represented by the dotted line 50 made of cadmium or boron which will absorb thermal neutrons and will pass neutrons of epithermal level to the detector. It is pervious to neutrons in the epithermal energy region but substantially impervious to neutrons in the thermal energy region. The shield 50 will be formed in the manner well known to those skilled in the art.

From the foregoing it will be seen that a highly efficient proportional type of detector of neutrons at thermal and/or epithermal energy levels is provided by confining a gas which is substantially exclusively helium-3 in a zone under pressures of several atmospheres, that is to say, pressures upwardly of about two atmospheres absolute. It will readily be appreciated that in order to provide a detector which properly functions and is yet portable in nature, the voltage requirement must be maintained at a minimum. Further, the use of voltages of the order of 3000 volts or more introduces spurious signals due to breakdown of insulation of component parts of the system and is thus objectionable. The use of helium-3 permits relatively low voltage operation at high efficiency with complete insensitivity to gamma radiation.

Figure 2:
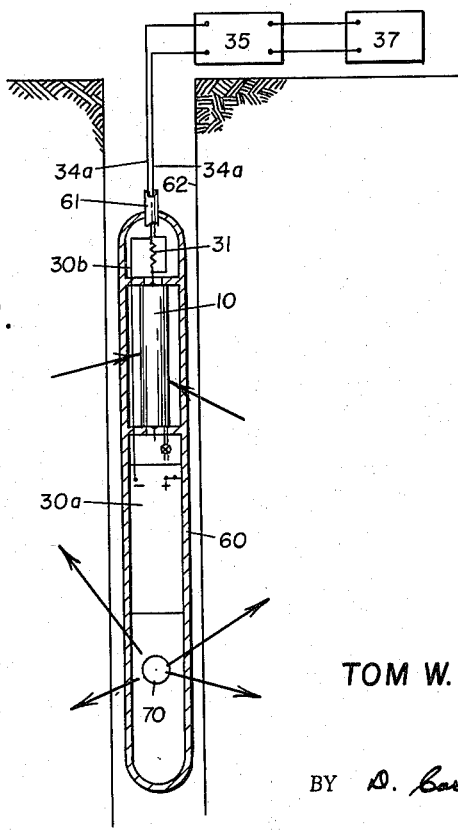
FIG. 2 illustrates a radioactive well logging system.

In the application of the present invention to neutron well logging, immediate benefits particularly as to savings in time are obtained. More particularly, in FIG. 2 there is shown a well logging system in which an exploring tool 60 is supported by cable 61 for movement through borehole 62. The tool 60 comprises an elongated, fluid-tight cylinder which supports at the upper end thereof the detector cylinder 10. Power supply 30a is connected by way of conductor 30b and resistor 31 to the center electrode in tube 10. The second terminal of power supply 30a is connected to the cylinder housing 60 and thus to the cylinder 10. The electrostatic field thus created provides for operation of the detector. The output voltage pulses appearing across resistor 31 are coupled by cable conductors 34a of cable 61 to the measuring units 35 and 37. The rate that electrical pulses appear at the output of detector 10, as a result of neutrons impinging detector 10, may thus be registered on a chart or other scale by unit 37 as a function of the depth of unit 60 in hole 62. But means thus far described, a log may be produced of the natural neutron activity of the formation. Alternatively, a suitable neutron source 70 may be employed supported in or carried by unit 60 to induce neutron radiations in the formations. In either event the detector 10 provides a basis for operating at speeds of travel of unit 60 much greater than heretofore possible with prior art systems.

While the invention has been described in connection with certain specific embodiments thereof, it will now be understood that further modifications will suggest themselves to those skilled in the art and it is intended to cover such modifications as fall within the scope of the appended claims.

What is claimed is:

1. A radiation detector of the proportional counter type comprising a pressure-tight closed container pervious to transmission therethrough of neutrons in the thermal and epithermal energy regions, an electrode extending through said container in spaced relation with the enclosing walls and insulated therefrom, a detector gas within said container of composition and pressure characterized by its high sensitivity to neutrons in the thermal and epithermal regions and its insensitivity to gamma rays, said gas consisting substantially exclusively of high purity helium-3 at a superatmospheric pressure of the order of from about two atmospheres absolute to about twenty atmospheres absolute, providing a cross section of about 5000 barns for the (n, p) type of reaction at thermal energy, and circuit connections extending to said electrode and to said container for application thereto of a direct current potential of the order of about 800 to about 3000 volts.

2. The radiation detector of claim 1 in which a shield pervious to neutrons of epithermal level and impervious to neutrons of thermal level is disposed in the form of a housing surrounding said container for transmittal to said detector gas of neutrons substantially exclusively those in the epithermal level.

3. The radiation detector of claim 1 in which said helium-3 is at a pressure of about two and one-half atmospheres absolute for development of a range of response to said neutrons essentially independent of change of said direct current potential over a range of about 850 volts to about 975 volts and in which said direct current potential is maintained within the aforesaid range for production of an output unaffected by changes in said direct current potential in the aforesaid range.

4. The radiation detector of claim 1 in which said helium-3 is at a pressure of about seven atmospheres aboslute for development of a range of response to said neutrons essentially independent of change of said direct current potential over a range of about 1100 volts to about 1275 volts and in which said direct current potential is maintained within the aforesaid range for production of an output unaffected by changes in said direct current potential in the aforesaid range.

5. A radiation detector of the proportional counter type comprising a pressure-tight closed container pervious to transmission therethrough of neutrons in the thermal and epithermal energy regions, an electrode extending through said container in spaced relation with the enclosing walls and insulated therefrom, a detector gas within said container of composition and pressure characterized by its high sensitivity to neutrons in the thermal and epithermal regions and its insensitivity to gamma rays, said gas consisting substantially exclusively of high purity helium-3 at a superatmospheric pressure of the order of from about two atmospheres to about twenty atmospheres and a quenching gas at a pressure of substantially less than one-half of one atmosphere, said helium-3 providing a cross section for thermal neutrons of about 5000 barns for the (n, p) type of reaction, and circuit connections extending to said electrode and to said container for application thereto of a direct current potential of the order of about 800 volts to about 3000 volts.

6. The radiation detector of claim 5 in which said helium-3 is at a pressure of about two and one-half atmospheres absolute and in which the direct current potential to be applied is in the range of about 850 volts to about 975 volts.

7. The radiation detector of claim 5 wherein the helium-3 is present at a pressure of seven atmospheres absolute and in which the direct current potential is of the order of about 1100 volts to about 1275 volts.

8. The radiation detector of claim 5 in which a shield perious to neutrons of epithermal level and impervious to neutrons of thermal level is disposed in the form of a housing surrounding said container for transmittal to said detector gas of neutrons substantially exclusively those in the epithermal level.

9. A radiation detector of the proportional counter type comprising a pressure-tight closed container pervious to transmission therethrough of neutrons in the thermal and epithermal energy regions, an electrode extending through said container in spaced relation with the enclosing walls and insulated therefrom, a detector gas within said container of composition and pressure characterized by its high sensitivity to neutrons in the thermal and epithermal regions and its insensitivity to gamma rays, said gas consisting substantially exclusively of high purity helium-3 at a superatmospheric pressure of the order of from about ten atmospheres to about twenty atmospheres, providing a cross section of about 5000 barns for the (n, p) type of reaction at thermal energy, and circuit connections extending to said electrode and to said container for application thereto of a direct current potential of the order of about 2000 volts.

10. The radiation detector of claim 9 in which a shield pervious to neutrons of epithermal level and impervious to neutrons of thermal level is disposed in the form of a housing surrounding said container for transmittal to said detector gas of neutrons substantially exclusively those in the epithermal level.

11. A radiation detector of the proportional counter type comprising a pressure-tight closed container pervious to transmission therethrough of neutrons in the thermal and epithermal energy regions, an electrode extending through said container in spaced relation with the enclosing walls and insulated therefrom, a detector gas within said container of composition and pressure characterized by its high sensitivity to neutrons in the thermal and epithermal regions and its relative insensitivity to gamma rays, said gas consisting substantially exclusively of high purity helium-3 at a superatmospheric pressure of the order of from above about two atmospheres absolute to about twenty atmospheres absolute, providing a cross section of about 5000 barns for the (n, p) type of reaction at thermal energy, and circuit connections extending to said electrode and to said container for application thereto of a direct current potential selected within the range of from 800 volts to about 3000 volts for production of an output proportional to the quantity of neutrons present in the thermal and epithermal energy regions and essentially independent of substantial variation of said direct current potential from its selected value.

References Cited in the file of this patent

UNITED STATES PATENTS

| 2,376,196 | Scherbatskoy | May 15, 1945 |
| 2,543,676 | Thayer et al. | Feb. 27, 1951 |
| 2,928,965 | Bayard | Mar. 15, 1960 |

OTHER REFERENCES

Bonner: Physical Review, vol. 43, June 1, 1933, pp. 871–874.

Batchelor et al.: The Review of Scientific Instruments, vol. 26, No. 11, pp. 1037–1047.

L. D. P. King and Louis Goldstein: The Total Cross Section of the He[3] Nucleus for Slow Neutrons, Physical Review, vol. 75, No. 9, May 1, 1949, pp. 1366–1369.

J. H. Coon and R. A. Nobles: Disintegration of He[3] and N[14] by Thermal Neutrons, Physical Review, vol. 75, beginning page 1358, 1949.

J. H. Coon: He[3] Isotopic Abundance, Physical Review, vol. 75, beginning at page 1355–1949.

J. H. Coon: Disintegration of He[3], by Fast Neutrons, Letters to the Editor in Physical Review, vol. 80, page 488, October-December 1950.

R. Batchelor: Neutron Energy Measurements with a Helium 3 Filled Proportional Counter, Proceedings of the Physical Society, vol. 65, Sec. A., January-December 1952, pp. 674–675.

A Multiple-Wire Proportional Counter for Fast Neutron Detection, by Sun et al., The Review of Scientific Instruments, vol. 25, No. 7, July 1954, pages 691 to 694.

(Other references on following page)

OTHER REFERENCES

U.S. Patent No. 2,712,081, Method for Neutron Well Logging, R. E. Fearon et al., June 28, 1955.

S. D. Bloom et al.: A High Pressure Proportional Counter for Fast Neutron Spectroscopy, Brookhaven National Laboratory, June 1955.

French Patent No. 1,200,954, Tom Wilkinson Bonner, July 6, 1959.

U.S. Patent No. 2,979,618, Helium 3 Logging Method, J. A. Rickard, April 11, 1961.

U.S. Patent No. 3,019,337, Well Logging by Selective Detection of Neutrons by Resonant Capture, R. E. Fearon et al., January 30, 1962.

Korff: Electron and Nuclear Counters, D. Van Nostrand Co., 1946, reprinted 1948, page 79.